May 23, 1933.   W. A. MacDONALD   1,910,399
WAVE SIGNALING SYSTEM
Filed July 21, 1930   3 Sheets-Sheet 1

INVENTOR
W. A. MacDonald
BY
Pennie, Davis, Marvin & Edmonds
ATTORNEYS

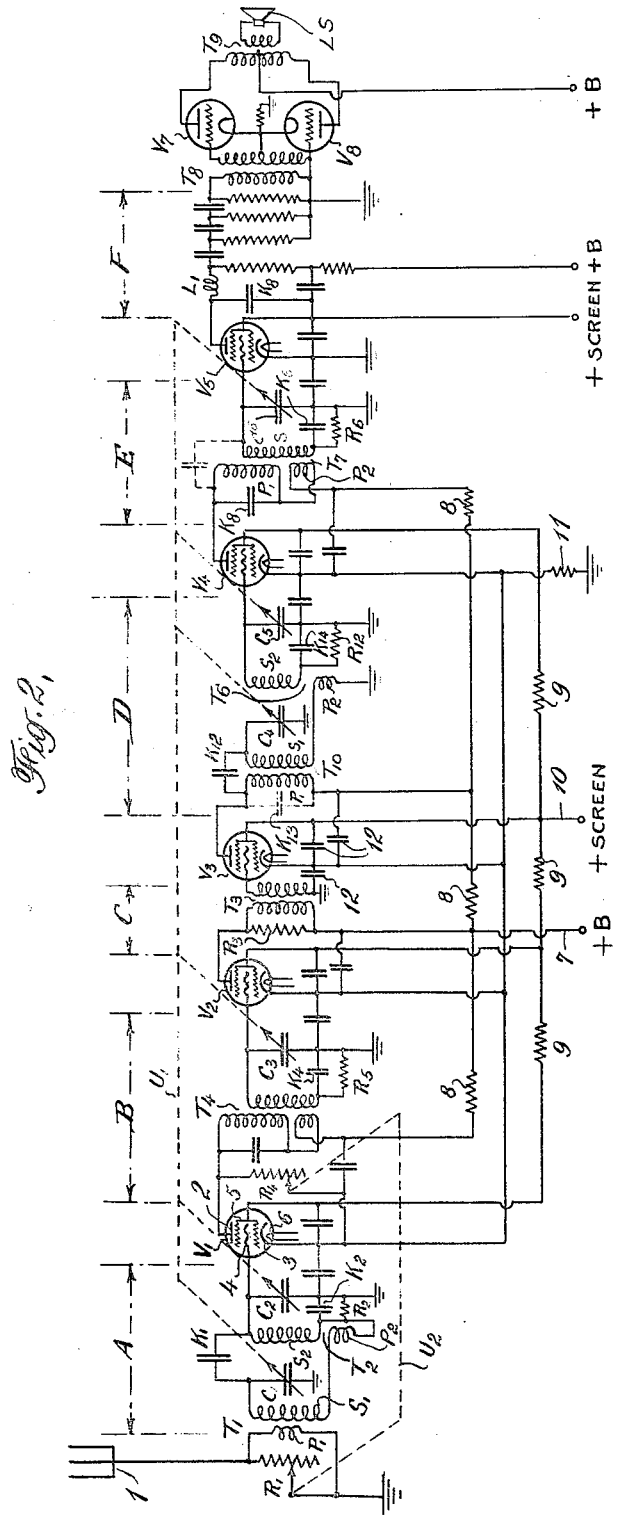

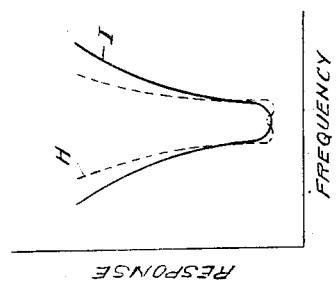
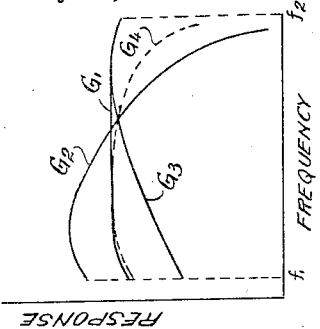
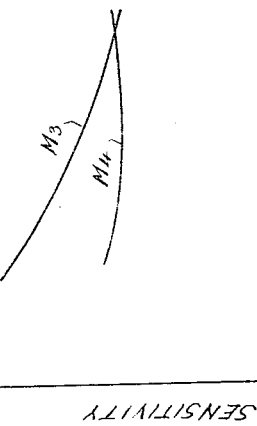
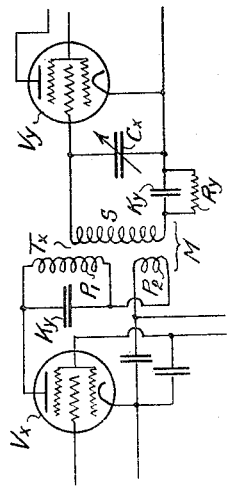
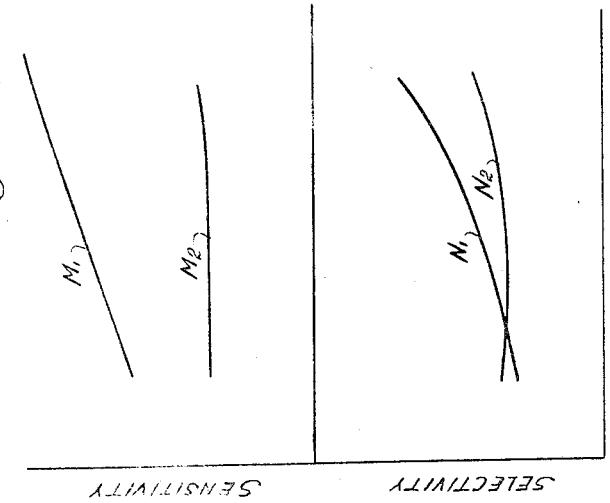
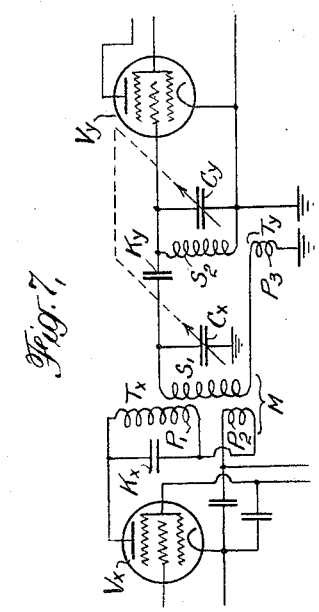

Patented May 23, 1933

1,910,399

UNITED STATES PATENT OFFICE

WILLIAM A. MacDONALD, OF LITTLE NECK, NEW YORK, ASSIGNOR TO HAZELTINE CORPORATION, OF JERSEY CITY, NEW JERSEY, A CORPORATION OF DELAWARE

WAVE SIGNALING SYSTEM

Application filed July 21, 1930. Serial No. 469,487.

This invention relates to radio receiving systems and more especially to multi-stage thermionic receivers tunable over a range in frequency and adapted for the reception of signals within the so-called "broadcast" band of frequencies.

A primary object of the invention is to provide a radio receiver of the type specified embodying the features of a gang operated multiple attenuator volume control for varying the signal intensity over a wide range of values in a substantially distortionless manner, an overall sensitivity response characteristic varying with frequency in a manner which is under control of the designer, an overall selectivity which is also under the control of the designer but which preferably is maintained substantially constant throughout the tuning range, and an improved audio-frequency characteristic so shaped as to compensate at least in part for the side-band attenuation of the higher audio-frequencies caused by the selectivity characteristics of the radio-frequency tuning system.

Detailed objects are to provide improved coupling circuits for interconnecting the antenna and first thermionic tube or for connecting successive tubes in cascade relation. The individual coupling circuits are adapted to slope the voltage amplification curve for a given stage in a desired manner which is under control of the designer. In the radio-frequency stages the individual coupling circuits are adapted further to control automatically the variation in resonance band width with frequency over the tuning range in accordance with a selected design. In the aggregate, the coupling circuits produce a final sensitivity-response curve of preselected slope, and an audio-frequency characteristic of substantially constant efficiency over the essential range of frequencies for speech and music.

A refinement consists in coupling the last radio-frequency amplifier tube to the detector by means of a coupling circuit having a higher voltage amplification ratio than the coupling systems associated with the preceding stages in order to prevent the tube preceding the detector from overloading.

Additional features of the invention will become apparent from the subsequent detailed description when read in conjunction with the appended drawings.

In connection with the coupling circuits described herein, the term "effective" or "resultant" coupling will be used. This will be understood as the total coupling, electrostatic as well as electromagnetic, existing between the portions of a circuit under consideration.

The invention will be best understood by immediate reference to the drawings, wherein Figure 1 shows diagrammatically a complete radio broadcast receiving system in accordance with the present invention, and Figure 2 shows a similar view of a modified circuit.

Figures 3, 4 and 5 show various forms of coupling circuits applicable to the present invention.

Figures 6, 8, 10 and 11 are graphs illustrative of the operational characteristics of the present invention.

Figures 7 and 9 show diagrammatically the circuits upon which curves of Figures 6 and 8 are based.

Figure 1:
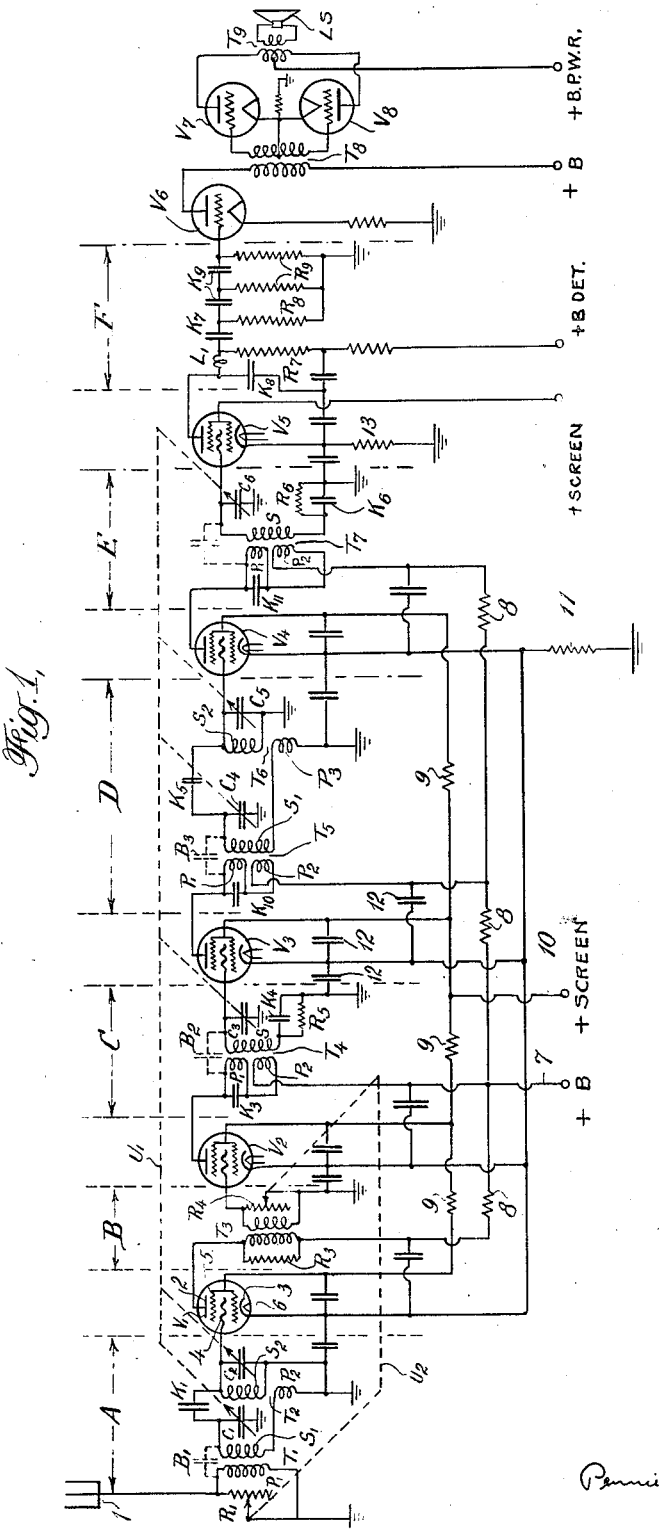

Referring to the drawings, the receivers comprise an antenna circuit 1, four thermionic tubes $V_1$ to $V_4$, inclusive, operating as stages of radio-frequency amplification, and a detector tube $V_5$, all of the screen-grid heater-element type, interconnected in cascade relation by means of coupling circuits B, C, D, and E, respectively, with the first tube suitably coupled to the antenna circuit through coupling circuit. In Figure 1, a coupling network F connects the detector output to the input of the first audio-frequency amplifier tube $V_6$, the output of which is connected through the transformer $T_8$ to a pair of power tubes $V_7$ and $V_8$ operating in the push-pull relation. The output circuits of the power tubes are connected in opposition through the transformer $T_9$ to a loud speaker LS. In Figure 2, the first audio-frequency amplifier tube $V_6$ is omitted, the detector output being coupled directly to the power tubes through the coupling circuit F terminating in the primary winding of transformer $T_8$.

The radio-frequency coupling circuits A to E, inclusive, are tunable over a range in frequency by means of the variable condensers $C_1$ to $C_6$, inclusive, which are gang operated by a uni-control device $U_1$ adapted to simultaneously adjust all circuits to the same resonance frequency.

Each screen grid tube is provided with anode 2, cathode 3, grid 4, screen grid 5, and filament 6. The filaments 6 operate in the well-known fashion to heat the cathodes 3 to the desired operating temperature and to this end may be supplied with current from any suitable source. The filament supply circuits are omitted from the drawings for the sake of clarity, inasmuch as they are well understood in the art and constitute no part in the present invention.

The anodes 2 and the screen grids 5 of the radio-frequency tubes are multipled to conductors 7 and 10 respectively, having suitable sources connected thereto for applying the necessary operating potentials to the tube electrodes. The cathodes 3 are grounded through the common resistance 11 which due to the flow of space current therethrough raises the cathodes to a positive potential above ground and is equivalent to negatively biasing the grids by the same amount since the latter are grounded.

With the form of bias provided by the potential drop in resistance 11, the negative bias on the grids is proportional to the magnitude of space current and hence functions automatically to stabilize the tube operation in that the biasing potential always varies in such manner as to oppose variations in the steady component of space current. This feature which finds a number of applications is especially useful in counteracting the effect of random variations in the mutual conductance of commercial tubes employed in the receiver. Due to the very high radio-frequency amplification employed in receivers of the type disclosed herein, it has been fond that the random variations from average of the mutual conductance of the tubes is sufficient to increase the receiver sensitivity by a factor of two or three as compared to the sensitivity obtained with the average tubes, with resultant increased tendency of the receiver toward regeneration and oscillation.

By employing the automatic bias in the form of resistance 11, if the mutual conductance of the tube is increased, this change in tube characteristic will have little or no effect on the overall receiver sensitivity since the tendency for an increase in plate current resultant upon the increased mutual conductance will immediately produce an opposing effect in the form of an increased negative bias on the grid tending to reduce the mutual conductance of the tube. The net effect will be that a very slight readjustment in plate current will compensate for a rather wide variation from average in the mutual conductance of the tube with consequent stabilization in the receiver operation.

Tubes $V_5$—$V_8$, inclusive, are supplied with proper operating potentials over circuits similar to those supplying tubes $V_1$—$V_4$, and accordingly will not be described in any detail since the circuits are obvious from the drawings.

For the tubes carrying high-frequency current, the low potential point of the anode, grid and screen grid circuits are coupled to the corresponding cathodes through the high-frequency by-passing condensers 12, which serve to prevent undesirable coupling effects between the input and output sections of the tubes and thus to minimize the tendency toward regeneration.

In order to isolate the potential supply circuits of tubes $V_1$—$V_4$ from each other in so far as regenerative effects are concerned, the anode circuits thereof are separated by means of the resistors 8 interposed in the battery leads extending to conductor 7. These resistors in conjunction with the associated by-passing condensers 12 serve as sections of resistance filters preventing the passage of high-frequency currents. In a similar manner the screen grid circuits are isolated by means of the resistors 9 interposed in the leads extending to conductor 10 cooperating with the associated by-passing condensers 12 to form filter sections. The values of the resistors 9 may be made much larger than resistors 8 due to the much smaller flow of space current in the screen grid circuits.

Coupling circuit A comprises a pair of coupled tunable circuits, or systems, interposed in cascade relation between the antenna and tube $V_1$ for selecting the desired signal with a high degree of discrimination. The nature and magnitude of the couplings between the tunable circuits are such as to cause the overall sensitivity and selectivity to vary in a desired manner over the tunable frequency range. Thus, to obtain substantially uniform sensitivity, i. e., constant voltage amplification as the frequency of tuning is varied, the primary $P_1$ of transformer $T_1$, included in the circuit with the antenna, may have an inductance sufficiently large in comparison with the antenna capacity that the natural periodicity of the antenna circuit is lower than the lowest frequency to be received. This causes the antenna circuit to respond most strongly to the lower frequencies within the tuning range and to discriminate against the higher frequencies, thereby offsetting wholly or in part the factors which are operative, in the well-known manner, to cause the voltage amplification from the primary to the tunable secondary circuit of the transformer $T_1$ to increase with the frequency of tuning.

By properly selecting the coupling impedance between the primary and secondary windings the effect produced in the secondary circuit for a given signal voltage operative from the primary circuit may be caused to remain substantially constant or to increase with the frequency of tuning at a desired rate. Thus, the gain-frequency characteristic is controlled by fixed impedance means.

The effect of the primary upon the secondary circuit may be intensified or diminished by the capacity $B_1$ electrostatically coupling the primary and secondary circuits, the particular effect produced being dependent upon whether the capacity coupling aids or opposes the magnetic coupling. The combination of the capacitive and magnetic couplings may properly be called a dual coupling. Capacity $B_1$ preferably comprises the inherent capacity existing between the primary and secondary turns of the transformer windings but a physical capacity may, of course, be used for this purpose. If the capacitive aids the magnetic coupling, the voltage amplification will tend to increase with the frequency, whereas for the dual, or two couplings opposed the design may be such as to cause the voltage ratio to decrease with frequency.

The resonant secondary circuit coupled to the antenna circuit comprises the secondary winding $S_1$ of transformer $T_1$ included in a closed series circuit with the primary winding $P_2$ of a second transformer $T_2$ and the variable condenser $C_1$ for adjusting the frequency of tuning. The resonant secondary circuit $S_1$—$C_1$—$P_2$ is coupled through a link circuit to a second tunable system comprising the secondary winding $S_2$ of transformer $T_2$ and the variable condenser $C_2$ connected thereacross. The link circuit comprises a dual coupling composed of the magnetic coupling impedance existing between the windings $P_2$ and $S_2$ together with the electrostatic coupling impedance provided by condenser $K_1$ extending between the high potential points of the two tunable circuits. The primary $P_2$ consists preferably of but a few turns of wire located at the low potential end of the form supporting the winding $S_2$.

Inasmuch as the magnetic coupling is substantially independent of frequency, whereas the electrostatic coupling increases with the frequency of tuning, the resultant effect produced in the resonant circuit $S_2$—$C_2$ may by proper proportioning and poling of the elements be caused to vary both the selectivity and sensitivity in a desired manner with frequency. If, for example, it is desired to obtain a more nearly uniform ratio of resonance band width, that is, of selectivity over the tuning range than is obtainable with the usual type of resonant circuit, the two couplings should be arranged to oppose each other. Further, the coupling at the low-frequency end of the band should be adjusted to optimum or slightly more than optimum coupling, the adjustment being such as to provide a resonance curve having a desired band width. As the frequency of tuning increases, the opposed relations of the electrostatic and the electromagnetic couplings will cause a condition of less than optimum coupling to be obtained for the higher frequencies, thereby tending to increase the sharpness of tuning. On the other hand, the natural increase with frequency of the load or effective resistance in the resonance circuit $S_2$—$C_2$ due, for example, to skin effect, eddy currents and the like, works in the opposite direction, tending to broaden the resonance curve. These two effects may by suitable design be caused to balance one another and thereby to produce a substantially constant degree of selectivity over the entire frequency scale. From the foregoing, it will be observed that the selectivity is controlled by fixed impedance means.

Inasmuch as with the arrangement described immediately above, the effective coupling between the first and second tunable circuits automatically decreases with increase in tuning frequency, the efficiency of energy transfer between circuits likewise decreases in the same manner and thus tends to produce a corresponding variation in the over-all voltage amplification ratio of the coupling circuit. In order to offset this effect, the coupling between primary and secondary circuits of transformer $T_1$ is adjusted to accentuate the voltage amplification toward the high-frequency end of the tuning range. In this way there is obtained an approximate balance of voltage gains in the two tuned circuits, as regards variation with tuning frequency, which results in an approximately flat gain characteristic as well as the above noted approach to uniform selectivity over the tuning range.

To attain the desired results, the capacity $K_1$ need not necessarily be connected between the high potential points of adjacent tuned circuits, but may be tapped to an intermediate point of either coil $S_1$ or coil $S_2$ or to intermediate points of both coils.

The set of curves in Figure 6 are illustrative of the results that may by proper design be obtained with a coupling network such as circuit A of Figure 1. Figure 6 gives the results of laboratory measurements made on a circuit of the type shown in Figure 7 and although the actual measurements are for coupling network interposed between a pair of thermionic valves, it will be apparent that the same results are obtainable when the connection is between an antenna circuit and a thermionic valve, as is the case for circuit A.

Referring now to Figure 6, curve $M_1$ shows the variation with the frequency of tuning of the voltage amplification as measured from the input section of tube $V_x$, Figure 7, to the first tuning condenser $C_x$. The design was such as to produce the rising amplification characteristic with frequency shown in order, as explained above, to offset the effect of decrease in coupling with frequency between the first and second tuned circuits $S_1$—$C_x$ and $S_2$—$C_y$, in order to provide substantially uniform overall amplification or sensitivity.

Curve $M_2$ shows the gain characteristic or overall sensitivity for the complete network as measured from the input section of tube $V_x$ to the input section of tube $V_y$ for the condition that the electrostatic coupling $K_y$ opposes the magnetic coupling $P_3$—$S_2$, the relative proportioning of the couplings being such as to provide slightly more than optimum coupling at the low-frequency limit and less than optimum coupling at the higher frequencies in order to insure substantially uniform selectivity. It is apparent from curve $M_2$ that the overall sensitivity is practically constant through the entire tuning range.

Curve $N_1$ is a measure of the total resonance band width at half-amplitude as measured across the first tuning condenser $C_x$; while curve $N_2$ gives corresponding measurements across the second tuning condenser $C_y$. Curve $N_2$ which is a measure of the overall selectivity is substantially flat, varying less than 20% over the tuning range.

It will be apparent from a study of the results in Figure 6 that a coupling network of the type shown in Figure 7 is admirably adapted for use in high-frequency systems since it permits the designer to control simultaneously the manner in which both sensitivity and selectivity vary with frequency.

Returning now to Figure 1, the nature of the requirements for voltage amplification and selectivity may be such that the coupling circuit A, as described, does not fully meet all conditions so that the alternative circuits may be found preferable. For example, a modification that may be utilized is to arrange the primary $P_1$ of transformer $T_1$ so that instead of being of high inductance it is of low inductance, thus causing the voltage amplification to increase with the frequency of tuning in the well-known manner. Then by opposing the capacitive coupling $K_1$ to the magnetic coupling $P_2$—$S_2$ and properly proportioning the magnitudes of these coupling impedances, the gain or voltage ratio of the tuning system may be maintained very flat, even though the effective coupling between the two tuned circuits, or systems, decreases toward the higher frequencies.

In Figure 2, three couplings are provided for circuit A that become effective in greater or less degree, depending upon the frequency of tuning. The magnetic coupling $P_2$—$S_2$ is substantially constant over the tuning range. The effect produced by capacity $K_2$ and resistance $R_2$ in shunt therewith included in resonant circuit $S_2$—$C_2$ is to provide an effective change in coupling between the two tuned circuits over the tuning range, the coupling provided by these elements being greatest in the low frequency range.

In addition, the impedance $K_2$—$R_2$ tends to increase the power factor of the tuned circuit $S_2$—$C_2$ at the lower frequencies, thus providing wider resonance bands at such frequencies than are normally obtainable. As the frequency of tuning increases the effective resistance inserted in the resonance circuit $S_2$—$C_2$ by the impedance $K_2$—$R_2$ automatically decreases, due to the by-passing effect of capacity $K_2$. This variation in the dissipative effect of the impedance $K_2$—$R_2$, it will be observed, is opposed to the normal mode of variation of the resistance in the resonance circuit $S_2$—$C_2$ introduced by skin effect, eddy current losses and the like, which factors tend to cause the effective resistance of the resonance circuit to increase with frequency. By properly proportioning the elements $K_2$—$R_2$, the automatic decrease in resistance of this impedance with frequency may be employed to substantially offset the inherent increase with frequency of the resistance in the resonance circuit $S_2$—$C_2$ so that the resultant effective resistance of this circuit remains substantially constant over the entire frequency range, resulting, of course, in a correspondingly constant degree of selectivity over the tuning band.

With a circuit of the type shown at A in Figure 2, the capacity coupling $K_1$ may or may not be employed and may be arranged to either aid or oppose the direct capacity coupling due to the condenser $K_2$, or may be made to aid or oppose the magnetic coupling $P_2$—$S_2$, or the capacitive couplings may be used exclusively, in which case the coils $P_2$ and $S_2$ may be positioned to provide no magnetic coupling therebetween.

The antenna circuit contains a variable resistance $R_1$ connected in shunt with the primary winding of the transformer $T_1$. This resistance constitutes a volume control for adjusting the signal intensity impressed upon the receiver.

By interposing the double-tuned circuit A between the antenna and the first amplifier tube, the desired signal may be chosen with such a high degree of selectivity that the system may be rendered substantially opaque to undesired extraneous signals while at the same time selecting the desired signal with minimum attenuation, thereby preventing intermodulation effects.

Directing attention now to the first of the interstage coupling networks, the output circuit of the first radio-frequency amplifier tube $V_1$ is in Figure 1 connected to the input of the second such tube $V_2$ through a coupling network B comprising an untuned transformer $T_3$, the primary winding of which is connected in the anode circuit of tube $V_1$ with the secondary winding connected between grid and cathode of tube $V_2$.

Transformer $T_3$ is constructed to have a substantially flat voltage amplification characteristic over the tunable range. To this end the coils are so made that the distributed capacity between turns affords natural periodicities within the tunable range. The transformer is further arranged to provide a small voltage step-up between primary and secondary circuits, and also to have a mutual inductance between windings which is not too high, the magnetic coupling being such as to introduce the two peaks in the resonance curves adjacent the upper and lower limits of the tuning band respectively. By winding the coils P and S of high resistance wire or by connecting a resistance such as $R_3$ across the primary winding, the peaks of the resonance curve may be flattened out to such an extent that the transformer provides substantially uniform response over the tunable frequency range.

An alternative design is to provide a magnetic coupling between primary and secondary windings, sufficiently close to introduce but a single resonance peak within the tuning range, and to properly damp this peak by means of the winding resistance or the shunt element $R_3$ to afford uniform voltage amplification.

The preferred design of this transformer is to construct the windings in several "pies" to minimize the distributed capacity between turns. These pies may comprise self-supporting coils held on an insulating mandrel or may be wound in slots cut in a separate form. The form may be enclosed in a metal cup to minimize the extent of external field. It is preferable that an iron cup be employed for this purpose since it increases the losses in the transformer circuit which, as pointed out above, are desirable in this instance.

A second volume control in the form of a variable resistance $R_4$ is connected in shunt with the secondary winding of the transformer $T_3$. The volume control $R_4$ is simultaneously adjustable with the control $R_1$ in the antenna circuit by means of a unicontrol device $U_2$ mechanically coupling the variable elements of these two resistances. In this way it is easily possible to secure an attenuation of 45 decibels per control or a total attenuation of 90 decibels. This form of control is especially desirable as it provides ample signal attenuation without altering the biasing potentials applied to the tube electrodes and thus permits the tubes to be operated at the most favorable portions of their characteristics at all times.

The use of a coupling circuit B for connecting the first and second tubes, having an untunable secondary circuit, provides several advantages, without introducing serious disadvantages inasmuch as the receiver is provided with sufficient tunable circuits at other points of the circuit to furnish the desired degree of overall selectivity.

In the first place, the omission of the tuning condenser from the secondary circuit of transformer $T_3$ permits the insertion of the second volume control element $R_4$ at this point. The volume control element $R_4$, of necessity, introduces a certain fixed capacity to ground equivalent to about six, or more, micro-micro-farads into the secondary circuit of the transformer, so that if a tuning condenser were connected in circuit at this point the minimum capacity of this circuit would exceed that of the other resonant circuits by the capacity of the volume control element. This would require that all of the other selecting circuits be padded up to the same minimum capacity, and would also necessitate the use of larger and more expensive variable condensers than is required with the circuit arrangement shown, since the tuning range covered by the variable condensers is determined by the ratio of the maximum to the minimum capacity. If the minimum capacity is increased, the maximum capacity must be increased in the ratio of the square of the upper and lower frequency limits in order to cover a given tuning range. This would mean, of course, that the variable capacities would have to be constructed to have a much larger maximum capacity than required with the arrangement shown.

The coupling circuit C connecting the output of the tube $V_2$ to the input of tube $V_3$ may be designed to provide substantially constant voltage amplification and selectivity over the tunable frequency range. The coupling transformer $T_4$ comprises a high inductance primary winding $P_1$ and a low inductance winding $P_2$ of relatively few turns, both windings being magnetically coupled to the secondary winding S. The primary winding $P_1$ is shunted by a capacity $K_3$ such that the circuit $K_3$—$P_1$ has a natural periodicity lower, but not greatly lower, than the lowest frequency within the tuning range. The circuit $K_3$—$P_1$ is thus capacitively reactive over the tuning range with the result that as the frequency of the tuning increases a smaller and smaller percentage of the total signaling current flowing in the output circuit of tube $V_2$ will flow through the winding $P_1$, thereby in effect automatically decreasing the coupling between windings $P_1$ and S as the frequency of tuning increases.

Winding $P_2$ is so connected to the circuit $K_3$—$P_1$ that the magnetic effects of the two primary windings upon the secondary circuit are additive. Since the coupling between the primary winding $P_2$ and the secondary winding S is substantially constant over the frequency range while the coupling between the windings $P_1$ and $S$ automatically decreases with increased frequency, the ratio of the voltage in the secondary circuit to the voltage in the primary circuit will rise with frequency, but at a rate which is under control of the designer and may be made such as to cause the amplification to remain substantially constant with frequency changes, or to rise with frequency at a desired rate.

Capacity $K_3$ is preferably small and may in certain cases comprise the distributed capacity of the winding $P_1$ and the anode-to-cathode capacity of tube $V_2$. In such cases, however, it is necessary to construct the winding $P_1$ in a special way to increase its distributed capacity, as, for example, by employing a bobbin one-half inch or more in length and layer-winding the turns of winding $P_1$ thereon.

The lower inductance primary winding $P_2$ comprises a relatively small number of turns which may be wound directly upon the low potential end of the form supporting the secondary winding $S$, or it may be wound directly over the low potential end of the secondary winding but separated therefrom by the thin sheet of insulating material such as varnished cloth or celluloid. It is preferable to space the turns of winding $P_2$ so that they have the same pitch as those of the secondary winding $S$, for in this way the distributed capacity between the two windings is reduced.

The secondary winding $S$ is tuned to resonance by means of variable condenser $C_3$ and has included in the resonance circuit the condenser $K_4$ shunted by resistance $R_5$. The impedance $K_4$—$R_5$ offers a higher resistance to the low ferquencies than to the high frequencies. By proper selection of the magnitudes of $K_4$ and $R_5$ the amount of resistance introduced into the tuned circuit may be made to vary automatically over a wide range as the frequency of tuning changes, so that it is possible to broaden the width of the resonance band or to increase the power factor of the circuit at the lower frequencies without materially affecting, or affecting only to a small degree, the power factor at the higher frequency range. In this way it is possible to secure almost any desired ratio of resonance band widths at the two ends of the tuning range. The results of both measurements and computation indicate that when employing a secondary circuit having a power factor of about 1%, the maximum broadening effect occurs when the resistance $R_5$ in ohms is about of the same order as the capacity reactance of $K_4$.

The natural capacity $B_2$ existing between the primary winding $P_1$ and the secondary winding $S$ of transformer $T_4$ may be arranged to aid or oppose the magnetic couplings between windings and thus intensify or diminish the magnetic coupling effects thereof as the frequency of tuning increases.

Figure 8 is illustrative of the results obtainable with coupling circuits such as network C, the curves having the same significance as those of Figure 6. The curves of Figure 8 represent the results of laboratory measurements using the circuit arrangement shown in Figure 9.

Curve $M_3$ shows the voltage amplification as measured from the input section of tube $V_x$ to the input section of tube $V_y$ for the condition that the dissipative impedance $K_y$—$R_y$ is short circuited; while curve $M_4$ gives the corresponding curve with the short-circuit removed, i. e., with the impedance $K_y$—$R_y$ included in the secondary circuit as shown in Figure 9. Curves $N_3$ and $N_4$ give the variations with frequency of the resonance band width at half amplitude as measured across condenser $C_x$ for the conditions that $K_y$—$R_y$ is short-circuited and is included in the secondary circuit respectively. It will be seen from these curves that by proper design a coupling circuit is obtained which provides substantially uniform sensitivity and selectivity throughout the tuning range.

In will be seen from a comparison of Figures 7 and 9 and the associated curves of Figures 6 and 8 respectively that two separate and distinct types of coupling circuits have been described for securing uniform selectivity throughout the tuning range. The circuit of Figure 7 relates to a structure wherein a pair of tunable circuits are coupled in cascade relation. Uniform selectivity is secured by arranging the gain characteristic of the entire unit and the effective coupling between tunable circuits in such a way that over optimum coupling is secured in the low-frequency range while under optimum coupling is secured at the higher frequencies. In practice this results in a resonance curve for the low-frequency range which has been artificially broadened in the region of resonance by from 5 to 10 kilocycles on either side of the exact resonance frequency, but which follows a normal resonance curve several channels removed from the resonance frequency. At the higher frequencies of tuning the complete resonance curve is, of course, of the conventional shape.

This point is illustrated by the curves of Figure 10 wherein curve I shows the frequency-response characteristic of the coupling circuit when tuned to a frequency near the upper frequency limit; while curve H gives the results for tuning near the low-frequency limit. Due to the effect of over-optimum coupling, curve H has the well understood double hump in the region of resonance which thus broadens the resonance band at its base to substantially the same width as is obtained with curve I. The width of bands H and I at resonance is, of course, designed to provide substantially uniform response with minimum attenuation over the essential band of audio-frequencies equivalent to one-half to one channel on either side of exact resonance. For wide departures from exact resonance, such as six or seven channels, the response curves do not have to be and, in fact, are not the same, as is indicated by the upper portions of curves H and I. The curves in this region are of the conventional character, with curve H narrower in this region than curve I due to the smaller losses occurring at the lower frequencies.

Now with respect to the second method of obtaining uniform selectivity over the tuning range, accomplished by insertion of the dissipative impedance $K_y$—$R_y$, Figure 9, in the resonance circuit, the resultant artificial widening of the resonance band at the lower frequencies is secured by actually increasing the effective power factor of the transformer which has the effect of broadening the resonance curve throughout its entire extent at such frequencies; so that if the resonance curves for the upper and lower frequency limits of tuning coincide at one channel from exact resonance, they will be of the same order of magnitude six or seven channels removed from resonance. Thus, referring to Figure 10, this resonance curve for tuning at the lower frequency will coincide with curve I for the upper frequencies. This distinction represents a slight difference in operating characteristics for the circuit of Figures 7 and 9, although the net result will be of the same order for the two circuits insofar as side band admission or elimination is concerned.

A double-tuned circuit D is employed in the arrangement of Fig. 1 to connect the output circuit of tube $V_3$ with the input circuit of the fourth radio-frequency amplification tube $V_4$. The output circuit of tube $V_3$ contains the double primary circuit of a so-called "uniform gain" transformer $T_5$ which is similar in operating characteristics to transformer $T_4$ discussed above. The high inductance primary winding $P_1$ is tuned by means of the fixed capacity $K_{10}$ in shunt therewith to a frequency lower but not greatly lower than the lowest frequency to be received. The primary windings $P_1$ and $P_2$ are so connected as to produce additive effects in the secondary circuit. The magnetic coupling between the two primary windings and the secondary is so proportioned as to give a desired slope in the amplification-frequency curve of the transformer. The secondary winding $S_1$ is tuned to resonance by means of the variable capacity $C_4$ connected between ground and the high potential end of the secondary, the low potential end thereof being connected through a low inductance primary winding $P_3$ of transformer $T_5$ to ground. The secondary circuit of transformer $T_5$ is coupled to tunable circuit $S_2$—$C_5$ through a link circuit comprising an electrostatic coupling by virtue of capacity $K_5$ extending between the high potential points of the secondary windings $S_1$ and $S_2$, and an electromagnetic coupling by virtue of the mutual inductance existing between windings $P_3$ and $S_2$. The tunable circuit $S_1$—$C_4$—$P_3$, together with coupling capacity $K_5$ is in fact a tunable intermediate circuit between the untunable primary circuit $P_1$—$P_2$—$K_{10}$ and the tunable secondary circuit $S_2$—$C_5$.

If a substantially uniform resonance band ratio is desired for the tuning range the capacity coupling $K_5$ can be arranged to oppose the magnetic coupling, and the two couplings combined, that is, the dual coupling, can be arranged to optimum or just over optimum coupling for the lowest frequency to be received. The magnetic coupling should predominate throughout the range. Then with the capacitive coupling opposing the magnetic the resulting coupling will decrease as the tuning frequency increases, thereby reducing the reaction of one resonant circuit upon the other to render the tuning sharper with increase in frequency, which effect opposes the natural tendency for the resonance curve to broaden out at the upper frequency limit, the resulting effect being such that the resonance band width is about the same throughout the frequency scale.

In order to insure that the coupling circuit D will provide substantially uniform voltage amplification over the tuning range, it is necessary that transformer $T_5$ be so designed that the voltage amplification for this transformer will increase with the frequency of tuning, as indicated in curve $M_1$ of Figure 6, to an extent necessary to offset the decrease in efficiency of energy transfer from the first to the second tuned circuit due to the automatic decrease in coupling therebetween.

The coupling circuit E connecting the output of tube $V_4$ to the input of the detector tube $V_5$ is similar in construction and operation to the coupling circuit C discussed above. It comprises the uniform gain transformer $T_7$ having a high inductance primary winding $P_1$ tuned by the shunt capacity $K_{11}$ to a frequency below the range, and a low inductance primary $P_2$. Both primaries are magnetically coupled in an additive sense to the resonant secondary circuit containing in series relation the tuning condenser $C_6$, secondary winding S, and the fixed capacity $K_6$ shunted by resistance $R_6$ for adjusting the resonance band width.

Coupling circuit E is preferably arranged so that it has a higher voltage gain than the circuit just preceding it, in order that powerful local signals of low modulation percentage will not overload the tube preceding this circuit before the full output of the power tube is obtained. This condition is very likely to occur where the detector works directly into the power tubes. For this same reason, it is desirable that coupling circuit E be designed for uniform gain, particularly when the tube preceding the detector tube $V_5$ is operating near the overload point.

The detector tube $V_5$ is of the screen grid type operating as a self-biasing tube due to connection of the cathode to ground thru resistance 13 which minimizes to a considerable degree the overload of the detector itself. The output of detector tube $V_5$ is coupled by means of circuit F to the input of a first audio-frequency amplifier tube $V_6$. Circuit F includes a resistance coupling network comprising resistances $R_7$ and $R_8$ included in the anode and grid circuits of tubes $V_5$ and $V_6$, respectively, the high potential terminals of the resistances being connected through a blocking condenser $K_7$ while the low potential terminals are connected through ground and the battery supply circuit.

Interposed between the ouput section of tube $V_5$ and resistance $R_7$ is a low-pass filter section comprising the series connected radio-frequency choke coil $L_1$ and the shunt capacity $K_8$ which functions to eliminate the radio frequency currents from the output circuit.

An audio-frequency high-pass filter comprising the series condensers $K_9$ and the shunt resistances $R_9$ serves to shape and audio-frequency characteristic of the system by reducing the response toward the low-frequency end of the range. The particular filter shown is merely intended to be indicative of the method employed for shaping the audio-frequency characteristic. In some instances it may be desirable to utilize a high-pass or even a band-pass filter to attain a desired response curve.

With receiving systems as normally constructed embodying the usual types of coupling circuits for inter-connecting the radio-frequency stages, the resonance band width increases with frequency of tuning due to the increase with frequency in effective resistance of the tuned circuits, producing thereby corresponding variations with frequency in the width of the side bands transmitted. If the selectivity is such as to transmit at the lower frequencies of tuning a band width corresponding to the essential range of audio-frequencies, then at the higher frequencies of tuning the band width transmitted will be so broad as to introduce extraneous signals from stations operating on other than the desired wave length. If, on the other hand, the selecting circuits are designed to transmit the essential range of audible frequencies when the tuning is adjusted for the upper frequency limit, marked side band attenuation or trimming will occur as the tuning is adjusted toward the low frequency limit due to the increase in selectivity with resultant suppression in the reproduced sound effects of the higher frequencies within the audio range. This latter condition cannot be effectively mitigated by shaping the characteristic of the audio-frequency portion of the receiver to compensate for the side band attenuation due to the variation with frequency in the amount of such attenuation.

With the present invention, however, wherein by means of the coupling circuits described, it is possible to obtain substantially uniform selectivity throughout the tunable range, the audio-frequency portion of the receiver may be designed to compensate effectively for the side-band attenuation throughout the frequency range. One method of shaping the audio frequency characteristic in this manner is by means of the low-frequency filter in coupling circuit F of Figure 1.

Figure 11 is illustrative of what may be accomplished by way of shaping the overall frequency characteristic for a receiver of the type disclosed herein. Curve $G_1$ which shows the response characteristic of the audio-frequency stages $V_6$ to $V_8$, inclusive, is substantially flat over the essential range of audible frequencies extending from $f_1$ to $f_2$. $G_2$ shows the overall fidelity characteristic of the receiver with the low-pass filter of coupling circuit F omitted and illustrates clearly the side band attenuation introduced due to the selecting networks at the higher audio frequencies. Curve $G_3$ shows the response characteristic for the audio-frequency portion of the receiver including a high-pass filter in the coupling circuit F suitably designed to compensate in part for the trimming caused by the selecting networks. Curve $G_4$ shows the final overall fidelity characteristic of the receiver with the high-pass filter included in the coupling circuit F and thus shows clearly the manner in which the audio-frequency characteristic has been improved. The curves of Figure 11 are not intended to be rigorously correct, but rather are illustrative of what may be accomplished by way of improving the overall receiver characteristic. It is to be stressed again that results such as shown in Figure 11 are obtainable only where, as in the present invention, the selecting networks are such as to provide a substantially uniform resonance band width throughout the tunable range.

The radio-frequency amplifier as a whole may be designed in several ways depending upon the operating conditions. Assume, for example, it is desired to employ tuned circuits having about the characteristics now commonly employed in broadcast receivers which have a power factor of about 1%, then by broadening the resonance band of the individual stages at the low-frequency range, while leaving the resonance band at the high-frequency range substantially unaffected, the ratio over the whole range will remain uniform. If the conventional number of three or four tuned circuits were to be employed, this broadening of the resonance band might impair the overall selectivity, but when employing coils having a 1% power factor, a larger number of tuned circuits will be employed than has heretofore been the practice, so, in this way, the desired overall selectivity can be secured.

Where a large number of tuned circuits are employed, theory and experiment indicate that the peak of the resonance curve may be quite broad while for conditions slightly off resonance the sides are very steep. This steepness of the sides of the resonance curve (just as at the low frequency range of present commercial receivers) tends to attenuate the side bands so that for the higher audio frequencies there is very little response. This undesirable condition may be corrected wholly or in part by the present invention because the resonance band width is made uniform over the tuning range in the manner explained above and the attenuation resulting at the higher audio frequencies may be compensated for in the audio system by either reducing the gain characteristic of the audio system at the low frequency range such as by interposition of the high pass filter circuit in the detector output or by increasing the high frequency response.

The present invention may be successfully practiced when employing the conventional number of three, four or five tuned circuits by using tuned resonant circuits of a lower power factor than 1%. This may be accomplished by employing larger diameter coils than now commonly used and winding the secondary inductances with larger sized wire spacing the turns, or using radio-frequency cable rather than solid wire. In this way it is possible to reduce the power factor of the tuned transformers to .5% or lower. This practice, whether employed with three or a greater number of tuned circuits, is likely to seriously impair the quality of reproduction because of side band cutting, but as previously described, the effects may easily be compensated for by proper shaping of the audio characteristic.

In many cases it is desirable to reduce the high-frequency response of the audio system, particularly above 3000 or 4000 cycles. This may be very conveniently accomplished in the present invention by proper selection of the number and power factor of the tuned circuits so that the side-band attenuation of the radio-frequency portion of the amplifier becomes effective in the region of 3000–4000 cycles, thus automatically giving the desired overall fidelity response.

Experience has indicated that where the sensitivity of a receiver is high, it is preferable to slope the gain characteristic so that it has about a 2:1 ratio; that is, it has about twice the sensitivity at the low-frequency as at the high-frequency range. By sloping the curve in this way, the stability and freedom from oscillation remains about uniform. This condition may, of course, not be desirable for all circumstances but may easily be modified as conditions warrant. Figure 2 shows a circuit designed in this manner.

In Figure 2 transformer $T_1$ of coupling circuit A is provided with a low inductance primary winding included in the antenna circuit, thus causing the voltage amplification from primary to secondary circuit to increase with frequency. The resonant secondary circuit of transformer $T_1$ is coupled to the secondary circuit of transformer $T_2$ capacitively by means of condenser $K_1$, magnetically by the mutual inductance between windings $P_2$ and $S_2$, and conductively by connection of the low potential terminals of windings $P_2$ and $S_2$. The proportioning and poling of the various couplings and the design of the dissipative circuit $K_2$—$R_2$ included in the resonant secondary circuit $S_2$—$C_2$, is such as to provide substantially uniform voltage amplification and constant selectivity over the tunable range.

Coupling circuit B connecting tubes $V_1$ and $V_2$ in cascade relation in this instance comprises a uniform gain transformer $T_4$ similar to that of coupling circuits C and E of Figure 1. The volume control resistor $R_4$ is in this instance bridged across the primary circuit of transformer $T_4$ since, for reasons explained above, it is undesirable to have this element bridging the tunable secondary circuit. The connection of control $R_4$ across the primary circuit of transformer $T_4$ necessitates insulation of all active portions of the control above ground potential, and in this respect does not provide so desirable an arrangement as the circuit of Figure 1.

It is, of course, not essential that transformers $T_4$ be of the uniform gain type. By employing such a transformer, however, it is possible to design the amplification characteristic to compensate for the capacitive reactance introduced into the primary circuit due to employment of the volume control and obtain substantially uniform resultant amplification over the tuning range. This result is attained by designing the transformer so that the impedance of the primary transformer circuit is proportionally higher at the high-frequency than at the low-frequency end of the tuning range. As a consequence, when the volume control is connected in circuit, it tends to equalize the impedance over the entire range, thus producing uniform amplification. The resistor $R_5$ and shunt capacity $K_4$, included in the resonant circuit, are selected of such values as to provide about the same or a slightly wider resonance band at the low than at the high frequency tuning range.

The broadly tuned aperiodic transformer $T_3$ now comprising circuit C coupling the output of tube $V_2$ with the input to tube $V_3$ may be given a voltage amplification slope favoring the low-frequency over the high-frequency response in about a 2:1 ratio in order to provide a corresponding overall frequency-response characteristic for the radio-frequency amplifier.

The double-tuned circuit D of Figure 2 employs a uniform gain type of transformer $T_{10}$ in the output circuit of tube $V_3$, the gain-frequency characteristic of which may be given a desired slope. The primary winding $P_1$ is wound to a relatively high inductance and in such manner that preferably the natural capacity $K_{13}$ between turns in conjunction with the anode-cathode capacity of tube $V_3$ is sufficient to render the primary circuit resonant at a frequency slightly below the tuning range. If necessary, of course, a separate condenser may be used to supplement the natural capacity $K_{13}$ in order to provide the required natural periodicity of the primary circuit. The primary $P_1$ is coupled to the tunable secondary winding by a dual coupling, that is, magnetically by means of the mutual inductance between windings and also capacitively by means of condenser $K_{12}$ connecting the high potential terminals of the two windings.

The primary winding due to the capacity in shunt therewith is capacitively reactive over the tuning range, and hence has a falling impedance characteristic for increases in frequency, which effect opposes the gain in voltage amplification with frequency, which in the absence of other factors would exist. This opposing effect is further intensified due to the automatic decrease in effective coupling between the primary and secondary circuits with increase in frequency resulting from the shunting effect of capacity $K_{13}$. The capacitive coupling $K_{12}$ may be arranged, depending upon the respective polarities of the high potential terminals of the primary and secondary windings, to either aid or oppose the magnetic coupling in the secondary circuit, the particular arrangement utilized being determined by the desired slope of the gain-frequency characteristic to be attained. In the present instance it is desirable to have substantially uniform frequency-gain characteristic for the transformer $T_{10}$ and accordingly the capacitive coupling $K_{12}$ is arranged to aid the magnetic coupling, since otherwise the rapid decrease in impedance of the primary circuit and the automatic decrease in effective coupling between the primary and secondary windings would cause the voltage amplification to decrease with increase in the tuning frequency.

The resonant secondary circuit of transformer $T_{10}$ includes the primary winding $P_2$ of transformer $T_6$ which is magnetically coupled to the tunable secondary winding $S_2$ thereof. The secondary winding $S_2$ is, in turn, included in a resonant circuit $S_2$—$C_5$ which contains the dissipative impedance $K_{14}$—$R_{12}$ proportioned to maintain an approximately constant resonance band width over the tuning range in the manner explained above. Thus, the circuit D when properly designed will have a substantially uniform overall frequency-gain characteristic, and likewise a substantially constant degree of selectivity over the tuning band.

The double-tuned circuit D of Figure 2 is, of course, an alternative arrangement to that of Figure 1, the transformer $T_5$ in one instance and $T_{10}$ in the other controlling the variation with frequency of the voltage amplification in an essentially similar fashion. It is to be understood that a transformer such as $T_{10}$ could, in general, with proper design modifications be used for coupling other portions of the receiver where the "uniform gain" type of transformer is desirable as, for example, in the coupling circuits C and E of Figure 1. Also, various other types of "uniform gain" coupling circuits are available which could be utilized to replace such transformers, as, for example, $T_4$, $T_5$ or $T_{10}$. Examples of such circuits are shown in Figures 3, 4, and 5. In each of these figures I represents the input terminals and O the output terminals.

In Figure 3 there is provided only a magnetic coupling between the primary winding P and the secondary winding S. The primary winding P is of relatively high inductance and is tuned by means of the natural capacity $K_{17}$ between turns or by a physical condenser to a frequency slightly below the tuning range. The primary circuit has therefore a falling impedance characteristic over the tuning range with increase in frequency, and further as the frequency increases there is an automatic decrease in effective coupling between the primary and secondary circuits due to the shunting effect of capacity $K_{17}$. Both of these effects offset the inherent tendency which would otherwise exist for the amplification to increase with frequency.

In Figure 4 the primary circuit winding P is again wound to a relatively high inductance and is tuned by means of the natural capacity $K_{18}$ between turns to a frequency slightly below the tuning band. In this instance, however, the primary circuit is coupled capacitively only to the secondary circuit by means of the coupling condenser $K_{15}$ connecting the high potential terminals of the primary and secondary windings P and S respectively. As the frequency of tuning increases, the primary winding P, due to its falling impedance characteristic tends to produce an ever decreasing effect in the secondary winding S. Opposed to this, however, is the effect of the capacitive coupling between the primary and secondary circuits, which increases with frequency, so that by properly selecting the impedance characteristic of the primary winding P and the magnitude of the coupling capacity $K_{15}$, the frequency-gain curve for the network may be sloped in a desired manner.

In the circuit of Figure 5 the primary winding P is of the same general order of inductance as the secondary winding and is coupled magnetically thereto by means of mutual inductance M between windings, and capacitively by means of condenser $K_{16}$ extending between the high potential terminals of the two windings. It will be observed that in this instance the primary winding is not resonant at a frequency below the tuning range, and accordingly its impedance will increase with frequency, thus tending to give a positive slope to the gain-frequency characteristic. While the capacitive coupling $K_{16}$ may be arranged to either aid or oppose the magnetic coupling or may not be employed at all, in general, it will be desirable to have the capacity oppose the magnetic coupling in order to provide substantially uniform amplification over the tuning band.

The high gain circuit E of Figure 2 is arranged to have a substantially flat amplification curve. By the proper selection of the condenser $K_6$ and resistor $R_6$ the selectivity characteristic is made either uniform or slightly broader at the low-frequency than at the high-frequency range.

Summing up the characteristics for the radio frequency amplifier, the overall sensitivity will have the desired 2:1 ratio favoring the low frequencies, while the overall selectivity will be substantially uniform over the tuning range.

In Figure 2 the first stage of audio-frequency amplification is omitted, the circuit F serving to connect the detector output directly through transformer $T_8$ to the power tubes $V_7$ and $V_8$ connected in the push-pull relation.

With the type of receiver shown in Figures 1 or 2 the sensitivity is made very high and to do this practically it is necessary to so position the parts, arrange the wiring and provide shielding so as to effectively eliminate extraneous couplings from stage to stage and from the input to the output.

Wherever possible, elements operated at low radio-frequency potentials such as by-pass condensers, audio-frequency transformers, etc., are physically interposed between adjacent high potential points and their shielding or casings grounded so that this mass acts to minimize capacitive fields. The elements of the various stages are preferably individually shielded by metal cans. For example, all the elements are mounted on a metal base and then the tuning condenser element is shielded by a metal can secured to the base so as to completely eliminate capacitive couplings between adjacent condensers and between condensers and other parts of the receiver.

The various tuning coils are preferably individually shielded by grounded metal cans. The amplifying tubes may be interposed between the metal cans to effectively shield the exposed portions from one another or they may be shielded by individual cans.

To eliminate common couplings in the chassis pan, wires and tuning condenser, etc., it has been found extremely helpful to connect, for example, the low potential terminal of each transformer secondary winding directly to its own tuning condenser rotor by means of a separate wire and brush contact rather than to ground such terminals to the chassis pan and rely on the connection from the pan to the condenser for a proper return path. It has also been found that when employing by-pass condensers, such as for the "A", "B" and "C" voltages, and also the plate by-pass for the detector, these connections should be made directly to the cathode of the tube under consideration rather than to ground. In this way common couplings resulting from currents flowing in the chassis pan are eliminated.

Couplings of the nature just discussed are especially important in a design such as those of Figures 1 and 2, because the desired couplings between adjacent stages are small and extraneous or unknown couplings might easily vitiate the desired effects.

I claim:

1. A high frequency electrical coupling system including a plurality of resonant circuits tunable throughout a frequency range, fixed impedance means in said coupling system comprising a circuit resonant at a fixed frequency slightly below said tuning range, whereby the gain-frequency characteristic of said system is controlled throughout said frequency range, and fixed impedance means in said coupling system so variable with frequency as to control the selectivity of said system throughout said frequency range.

2. A high frequency electrical coupling system including a plurality of resonant circuits tunable throughout a frequency range, fixed impedance means in said coupling system comprising a circuit resonant at a fixed frequency slightly below said frequency range, whereby the gain-frequency characteristic of said system is controlled throughout said frequency range, and fixed impedance means in said coupling system so variable with frequency as to provide a desired ratio of resonance band widths for said system at the upper and lower frequency limits.

3. A high frequency electrical coupling system including a plurality of resonant circuits tunable throughout a frequency range, fixed impedance means in said coupling system comprising a circuit resonant at a fixed frequency slightly below said frequency range, whereby the gain frequency characteristic of said system is controlled throughout said frequency range, and fixed impedance means in said coupling system so variable with frequency as to maintain the selectivity of said system substantially constant throughout said frequency range.

4. A high frequency electrical coupling system including a plurality of resonant circuits tunable throughout a frequency range, fixed impedance means in said system comprising a circuit resonant at a fixed frequency slightly below said frequency range, whereby the gain-frequency characteristic of said system is controlled throughout said frequency range, and fixed impedance means in said coupling system producing effects so variable with frequency as to maintain the selectivity of said system substantially constant throughout said frequency range.

5. A high frequency electrical coupling system, comprising in sequence between input and output sections an untuned primary circuit, a tunable intermediate circuit, and secondary circuit, fixed impedance means so coupling one said circuit to a second as to provide a dualistic coupling reaction so variable with frequency as to control the selectivity of said system throughout a tunable frequency range, and fixed impedance means so coupling the second said circuit to the third as to produce a dualistic coupling reaction for controllably sloping the gain-frequency characteristic of said system throughout said frequency range.

6. A high frequency electrical coupling system comprising, in sequence between input and output sections, an untuned primary circuit, a tunable intermediate circuit, and a tunable secondary circuit, fixed impedance means so coupling one said circuit to a second as to provide a dualistic coupling reaction so variable with frequency as to minimize variations in selectivity of said system throughout a tunable frequency range, and fixed impedance means so coupling the second said circuit to the third as to produce a dualistic coupling reaction for controllably sloping the gain-frequency characteristic of said system throughout said frequency range.

7. A high frequency electrical coupling system comprising a resonant secondary circuit tunable throughout a frequency range, and a primary circuit including fixed impedance means so arranged and coupled to said secondary circuit as to produce therein dualistic reactions so variable with frequency as to controllably slope the gain-frequency characteristic of said system throughout said frequency range, and dissipative impedance means included in said secondary circuit producing effects so variable with frequency as to control the selectivity of said system throughout said frequency range.

8. A high frequency electrical coupling system comprising, a resonant secondary circuit tunable throughout a frequency range, and a primary circuit including fixed impedance means so arranged and coupled to said secondary circuit as to produce therein dualistic reactions so variable with frequency as to controllably slope the gain-frequency characteristic of said system, and dissipative impedance means included in said secondary circuit producing effects so variable with frequency as to produce a selected ratio of resonance band widths at the upper and lower frequency limits of said range.

9. In a high frequency signaling system, in combination, a plurality of coupling systems arranged in tandem, a first of said coupling systems including a circuit tunable over a range in frequency and having elements so proportioned with respect to each other that the ratio of the output voltage to the input voltage of said first system rises with increased frequency over said frequency range, a second of said coupling systems including a circuit tunable over said frequency range and being coupled to said first circuit by a dual coupling whereby said system may be uniformly selectively tuned over said range and a constant ratio of output to input voltage maintained.

10. A combination according to claim 9 in which the first of said coupling systems comprises a primary circuit and a tunable secondary circuit coupled to the primary circuit by a dual coupling.

11. A high frequency coupling system comprising a pair of input terminals, a pair of output terminals and a pair of tunable circuits coupled in tandem between said pairs of terminals, the first of said tunable circuits comprising a primary circuit and a tunable secondary circuit coupled together by a dual coupling, said primary circuit being connected to said input terminals and said second tunable circuit being coupled to said first tunable circuit by a dual coupling and also being connected to said output terminals, whereby a uniform degree of sensitivity and selectivity may be obtained over a range in frequency.

12. In a high frequency amplifier, tunable over a range in frequency, a pair of amplifying tubes and a coupling means for coupling said tubes in tandem, said coupling means comprising a plurality of tunable systems, the first of said tunable systems comprising a primary circuit having a pair of windings one of which is resonant at a frequency slightly below said tuning range and the other of which is resonant above said frequency range and a secondary winding coupled to said primary windings and tunable by a variable capacity over said frequency range, the second of said tunable systems comprising a secondary winding tunable over said frequency range by a variable capacity and coupled to the secondary circuit of the first of said systems by a primary winding and by a coupling capacity, whereby a uniform degree of amplification and a high degree of selectivity is maintained when said variable capacities are manipulated to tune the amplifier over said frequency range.

13. A combination according to claim 12 in which a uni-control arrangement is employed to manipulate said variable capacities simultaneously, whereby said amplifier may be tuned by a single adjustment.

14. A combination according to claim 12 in which said coupling capacity transfers energy from said first tunable system to said second tunable system substantially 180° out of phase with the energy transferred by the primary winding of said second tunable system.

15. In an electric signaling arrangement, a tunable coupling system for coupling two portions thereof, said coupling system comprising a pair of input terminals and a pair of output terminals, an inductance element connected between said pair of input terminals, a pair of adjustably resonant circuits coupled together by a dual coupling, a control member for simultaneously adjusting the resonance frequencies of said circuits, the first of said resonant circuits being coupled to said inductance element by a dual coupling and the second of said resonant circuits being connected to said output terminals, said dual couplings being proportioned to maintain said band width substantially uniform over said tuning range and to maintain a uniform degree of sensitivity.

16. A combination according to claim 15 in which said dual coupling is a combined capacitive and magnetic coupling.

17. A combination according to claim 15 in which the two couplings constituting each of said dual couplings are in aiding phase with each other.

18. A combination according to claim 15 in which the two couplings constituting the dual couplings between said resonant circuits are in opposing phase with respect to each other.

19. A combination according to claim 15 in which said inductance element is shunted by capacity of such value that it is naturally resonant at a frequency below said tuning range.

20. An electrical circuit arrangement for producing uniform sensitivity over an extended tuning frequency range which includes an input coil and two adjustably resonant circuits including coils, said input coil having an inductance greater than the inductance of the coils in said adjustably resonant circuits, coupling means between said input coil and one of said resonant circuits, and effective coupling means between said resonant circuits having a coupling impedance which varies inversely with the frequency to which said adjustably resonant circuits are tuned.

21. A high frequency coupling system comprising a pair of coupling circuits tunable over a range in frequency, a first of said tunable circuits comprising a primary circuit naturally resonant at a frequency slightly below said frequency range, and the second of said tunable circuits being coupled to said first circuit through a link circuit including a coupling impedance.

22. A high frequency coupling system according to claim 21, in which the coupling impedance in said link circuit is a capacity.

23. A high frequency coupling system according to claim 21, in which the coupling impedance in said link circuit is an inductance.

24. A high frequency coupling system according to claim 21, in which the coupling impedance of said link circuit includes an inductance and a capacity arranged to provide a dual coupling.

25. A high frequency coupling system comprising a pair of tunable circuits, a first of said circuits comprising a primary circuit coupled to a tunable secondary circuit through a dual coupling, and the second of said tunable circuits being coupled to said first circuit through a link circuit including a coupling impedance.

26. A high frequency coupling system according to claim 25, in which the coupling impedance of said link circuit is inductive.

27. A high frequency coupling system according to claim 25, in which the coupling impedance of said link circuit is capacitive.

28. A high frequency coupling system comprising a pair of input terminals, a pair of output terminals and a pair of circuits tunable over a range in frequency, a first of said circuits comprising a primary circuit connected to said input terminals, said primary circuit including an impedance naturally resonant at a frequency slightly below said frequency range, and the second of said tunable circuits being coupled to said first tunable circuit through a link circuit which includes a coupling impedance, the output of the second of said tunable circuits being connected to said output terminals.

29. In a high frequency coupling system comprising a pair of input terminals and a pair of output terminals, a pair of tunable circuits tunable over a range in frequency, said tunable circuits being coupled in tandem between said pairs of terminals, means for supplying signal voltage to one of said tunable circuits including a fixed resonant circuit whose resonant frequency is lower than the lowest frequency of said range, and capacity coupling between said fixed resonant circuit and one of said tunable circuits.

30. In a high frequency coupling system including a pair of tunable circuits coupled in tandem, means for supplying signal voltage to a first of said tunable circuits, said means including an inductive reactance, and a capacity coupling between a terminal of said inductive reactance and a terminal of said first tunable circuit.

31. In a high frequency coupling system including a pair of tunable circuits coupled in tandem and a fixed resonant circuit, means for coupling a first of said tunable circuits and said fixed resonant circuit, said means including a capacity connecting the high potential terminals of said first tunable circuit and said fixed resonant circuit.

32. A high frequency electrical coupling system comprising a resonant secondary circuit tunable throughout a frequency range, and a primary circuit having an inductance tuned to a fixed frequency slightly below said frequency range to controllably slope the gain-frequency characteristic of said system throughout said range, and dissipative impedance means included in said secondary circuit producing effects so variable with frequency as to control the selectivity of said system throughout said range.

In testimony whereof I affix my signature.

WILLIAM A. MacDONALD.